United States Patent
Komori et al.

(10) Patent No.: US 11,919,547 B1
(45) Date of Patent: Mar. 5, 2024

(54) VEHICLE CONTROL DEVICE, VEHICLE SYSTEM, VEHICLE CONTROL METHOD, AND PROGRAM

(71) Applicant: HONDA MOTOR CO., LTD., Tokyo (JP)

(72) Inventors: Yuichi Komori, Wako (JP); Yoshifumi Nakamura, Wako (JP); Takuma Kobayashi, Wako (JP); Shingo Ito, Wako (JP); Ayumu Horiba, Wako (JP); Tadahiko Kanoh, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/268,626

(22) PCT Filed: Dec. 28, 2020

(86) PCT No.: PCT/JP2020/049103
§ 371 (c)(1),
(2) Date: Jun. 21, 2023

(87) PCT Pub. No.: WO2022/144959
PCT Pub. Date: Jul. 7, 2022

(51) Int. Cl.
*B60W 60/00* (2020.01)
*B60Q 1/14* (2006.01)
*B60W 30/182* (2020.01)
*B60W 50/02* (2012.01)
*B60W 30/18* (2012.01)

(52) U.S. Cl.
CPC ......... *B60W 60/005* (2020.02); *B60Q 1/1484* (2013.01); *B60W 30/182* (2013.01); *B60W 50/0205* (2013.01); *B60W 30/18163* (2013.01)

(58) Field of Classification Search
CPC ........... B60W 60/005; B60W 50/0205; B60W 30/182
See application file for complete search history.

(56) References Cited

U.S. PATENT DOCUMENTS

2017/0357361 A1   12/2017   Hong et al.
2020/0043254 A1   2/2020   Hase et al.
(Continued)

FOREIGN PATENT DOCUMENTS

CN   110077420   8/2019
CN   111683847   9/2020
(Continued)

OTHER PUBLICATIONS

Chinese Office Action for Chinese Patent Application No. 202080107872.1 dated Oct. 12, 2023.
(Continued)

*Primary Examiner* — Jeff A Burke
*Assistant Examiner* — Zachary Joseph Wallace
(74) *Attorney, Agent, or Firm* — Amin, Turocy & Watson, LLP

(57) ABSTRACT

A vehicle control device includes a driving controller controls one of or both steering and acceleration/deceleration of the vehicle, and a mode determinator determines any of a plurality of driving modes including a first driving mode and a second driving mode as a driving mode of the vehicle, in which tasks imposed on a driver in the second driving mode are less significant than in the first driving mode and one of or both steering and acceleration/deceleration of the vehicle are controlled by the driving controller, the driving controller controls the vehicle in the second driving mode, and the driving mode is changed to the first driving mode when an abnormality occurs in a combination switch, combination switch related equipment which is connected between the driving controller and the combination switch via a communication line, or communication which is performed by the combination switch and the driving controller.

8 Claims, 8 Drawing Sheets

| | CONDITIONS FOR JUDGMENT | ESTIMATED ABNORMALITY |
|---|---|---|
| (1) | INFORMATION INDICATING FAILURE OF COMBINATION SWITCH IS RECEIVED FROM INSTRUMENT DEVICE, AND THIS STATE HAS CONTINUED FOR FIRST TIME (FOR EXAMPLE, 1 [s]) | FAILURE OF COMBINATION SWITCH<br><br>FLAW IN COMMUNICATION BETWEEN COMBINATION SWITCH AND MULTIPLEX INTEGRATED CONTROL UNIT |
| (2) | INFORMATION INDICATING FAILURE OF AUTOMATIC LIGHT SWITCH IS RECEIVED FROM INSTRUMENT DEVICE, AND THIS STATE HAS CONTINUED FOR FIRST TIME (FOR EXAMPLE, 1 [s]) | FAILURE OF MULTIPLEX INTEGRATED CONTROL UNIT |
| (3) | INFORMATION INDICATING THAT TURN LEVER IS IN MECHANICALLY LOCKED STATE IS RECEIVED FROM INSTRUMENT DEVICE | TURN LEVER IS IN MECHANICALLY LOCKED STATE |
| (4) | INFORMATION INDICATING THAT WINDSHIELD WIPER SWITCH HAS FAILED IS RECEIVED, AND THIS STATE HAS CONTINUED FOR SECOND TIME (FOR EXAMPLE, 1 [s]) | FAILURE OF WINDSHIELD WIPER SWITCH<br><br>FLAW IN COMMUNICATION BETWEEN WINDSHIELD WIPER SWITCH AND MULTIPLEX INTEGRATED CONTROL UNIT<br><br>FAILURE OF MULTIPLEX INTEGRATED CONTROL UNIT |
| (5) | INFORMATION INDICATING THAT MULTIPLEX INTEGRATED CONTROL UNIT HAS FAILED IS RECEIVED FROM INSTRUMENT DEVICE, AND THIS STATE HAS CONTINUED FOR THIRD TIME (FOR EXAMPLE, 1 [s]) | FAILURE OF MULTIPLEX INTEGRATED CONTROL UNIT<br><br>FLAW IN COMMUNICATION BETWEEN MULTIPLEX INTEGRATED CONTROL UNIT AND INSTRUMENT DEVICE<br><br>FAILURE OF INSTRUMENT DEVICE |

(56) References Cited

U.S. PATENT DOCUMENTS

| | | |
|---|---|---|
| 2020/0298727 A1 | 9/2020 | Ukai et al. |
| 2020/0302787 A1 | 9/2020 | Namba |
| 2020/0353941 A1 | 11/2020 | Wang et al. |
| 2020/0377113 A1* | 12/2020 | Whikehart ............ B60W 50/14 |
| 2021/0016785 A1 | 1/2021 | Nakagawa |
| 2021/0133057 A1* | 5/2021 | Hayes ................. G07C 5/0808 |
| 2021/0163021 A1* | 6/2021 | Frazzoli ................ B60W 50/02 |
| 2021/0206395 A1* | 7/2021 | Guo .................. B60W 60/0051 |
| 2021/0394772 A1* | 12/2021 | Hayes ............... B60W 50/0205 |
| 2022/0144307 A1* | 5/2022 | Jung ..................... B60W 50/16 |
| 2022/0194420 A1* | 6/2022 | Chu ................ B60W 30/18154 |
| 2022/0363276 A1* | 11/2022 | Wulf ................... B60W 50/029 |

FOREIGN PATENT DOCUMENTS

| | | |
|---|---|---|
| CN | 111874001 | 11/2020 |
| JP | 63-002750 | 1/1988 |
| JP | 2016-020189 | 2/2016 |
| JP | 2017-224266 | 12/2017 |
| JP | 2018-180843 | 11/2018 |
| JP | 6678905 | 4/2020 |
| JP | 2020-152139 | 9/2020 |
| JP | 2020-154624 | 9/2020 |
| JP | 2020-184302 | 11/2020 |
| KR | 10-2020-0068770 | 6/2020 |

OTHER PUBLICATIONS

International Search Report and Written Opinion for International Application No. PCT/JP2020/049103 dated Mar. 23, 2021, 8 pages.
Japanese Office Action for Japanese Patent Application No. 2022-527924 dated Aug. 30, 2022.
Japanese Decision to Grant a Patent for Japanese Patent Application No. 2022-527924 dated Feb. 8, 2023.
Japanese Decision to Grant a Patent for Japanese Patent Application No. 2022-527924 dated Jan. 24, 2023.

* cited by examiner

FIG. 3

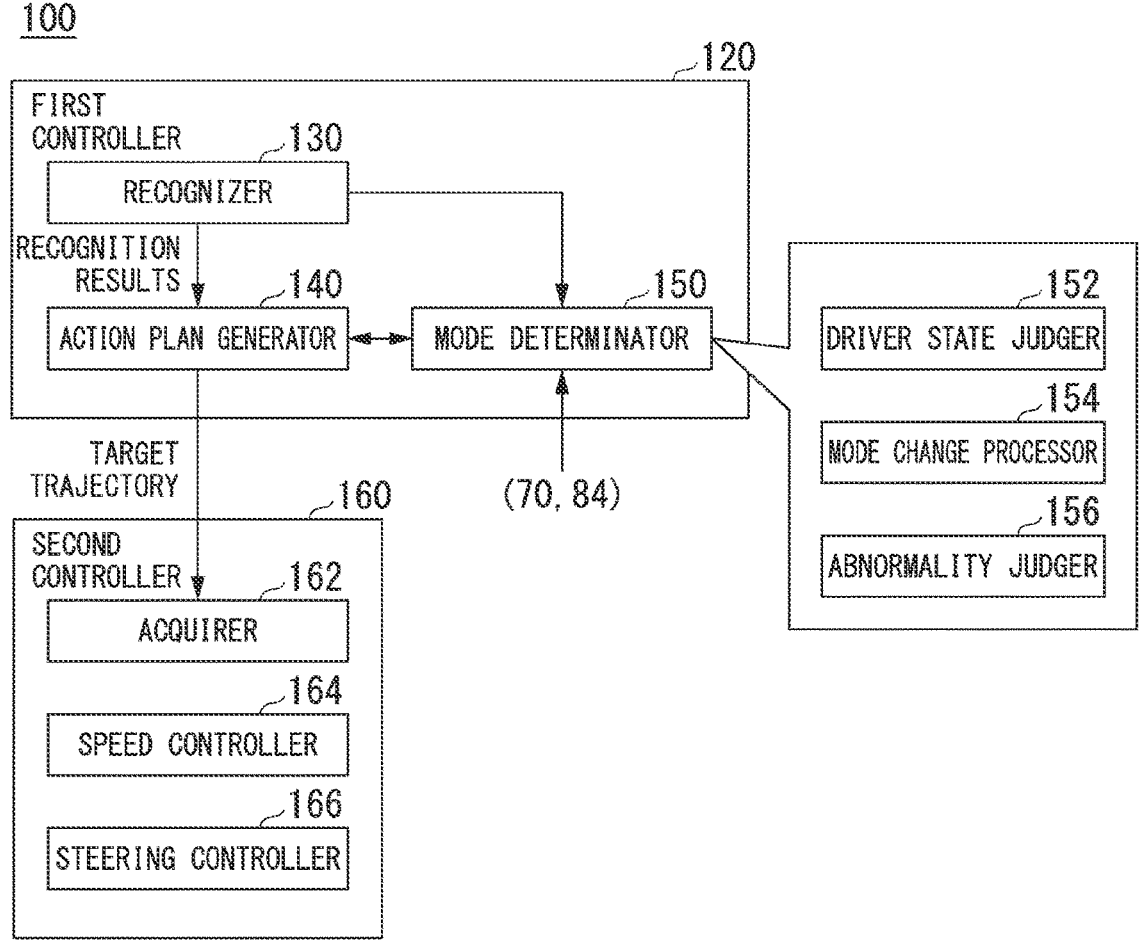

FIG. 4

| DRIVING MODE | CONTROL STATE | TASK | |
|---|---|---|---|
| MODE A | AUTOMATED DRIVING | FRONT SIDE MONITORING: NOT REQUIRED STEERING WHEEL GRASPING: NOT REQUIRED | ↑ TASK: LESS SIGNIFICANT |
| MODE B | AUTOMATED DRIVING | FRONT SIDE MONITORING: REQUIRED STEERING WHEEL GRASPING: NOT REQUIRED | |
| MODE C | AUTOMATED DRIVING | FRONT SIDE MONITORING: REQUIRED STEERING WHEEL GRASPING: REQUIRED | |
| MODE D | DRIVING ASSISTANCE | AT LEAST DRIVING OPERATION TO CERTAIN EXTENT IS REQUIRED | |
| MODE E | MANUAL DRIVING | DRIVING OPERATION IS REQUIRED TOGETHER WITH STEERING AND ACCELERATION/DECELERATION | ↓ TASK: MORE SIGNIFICANT |

FIG. 7

| | CONDITIONS FOR JUDGMENT | ESTIMATED ABNORMALITY |
|---|---|---|
| (1) | INFORMATION INDICATING FAILURE OF COMBINATION SWITCH IS RECEIVED FROM INSTRUMENT DEVICE, AND THIS STATE HAS CONTINUED FOR FIRST TIME (FOR EXAMPLE, 1 [s]) | FAILURE OF COMBINATION SWITCH<br><br>FLAW IN COMMUNICATION BETWEEN COMBINATION SWITCH AND MULTIPLEX INTEGRATED CONTROL UNIT<br><br>FAILURE OF MULTIPLEX INTEGRATED CONTROL UNIT |
| (2) | INFORMATION INDICATING FAILURE OF AUTOMATIC LIGHT SWITCH IS RECEIVED FROM INSTRUMENT DEVICE, AND THIS STATE HAS CONTINUED FOR FIRST TIME (FOR EXAMPLE, 1 [s]) | |
| (3) | INFORMATION INDICATING THAT TURN LEVER IS IN MECHANICALLY LOCKED STATE IS RECEIVED FROM INSTRUMENT DEVICE | TURN LEVER IS IN MECHANICALLY LOCKED STATE |
| (4) | INFORMATION INDICATING THAT WINDSHIELD WIPER SWITCH HAS FAILED IS RECEIVED, AND THIS STATE HAS CONTINUED FOR SECOND TIME (FOR EXAMPLE, 1 [s]) | FAILURE OF WINDSHIELD WIPER SWITCH<br><br>FLAW IN COMMUNICATION BETWEEN WINDSHIELD WIPER SWITCH AND MULTIPLEX INTEGRATED CONTROL UNIT<br><br>FAILURE OF MULTIPLEX INTEGRATED CONTROL UNIT |
| (5) | INFORMATION INDICATING THAT MULTIPLEX INTEGRATED CONTROL UNIT HAS FAILED IS RECEIVED FROM INSTRUMENT DEVICE, AND THIS STATE HAS CONTINUED FOR THIRD TIME (FOR EXAMPLE, 1 [s]) | FAILURE OF MULTIPLEX INTEGRATED CONTROL UNIT<br><br>FLAW IN COMMUNICATION BETWEEN MULTIPLEX INTEGRATED CONTROL UNIT AND INSTRUMENT DEVICE<br><br>FAILURE OF INSTRUMENT DEVICE |

FIG. 8

| | CONDITIONS FOR STARTING JUDGMENT |
|---|---|
| (1), (2), (4), (5) | FOLLOWING (a), (b), AND (c) ARE SATISFIED<br>(a) FOURTH TIME (FOR EXAMPLE, 5 [s]) HAS ELAPSED IN STATE IN WHICH INPUT VOLTAGE OF FIRST CONTROL DEVICE IS FIRST VOLTAGE OR HIGHER<br>(b) COMMUNICATION WITH INSTRUMENT DEVICE IS NORMAL<br>(c) NO ABNORMALITY HAS OCCURRED IN COMMUNICATION USING COMMUNICATION LINE CONNECTED TO INSTRUMENT DEVICE |
| (3) | AT ALL TIMES |

VEHICLE CONTROL DEVICE, VEHICLE SYSTEM, VEHICLE CONTROL METHOD, AND PROGRAM

TECHNICAL FIELD

The present invention relates to a vehicle control device, a vehicle system, a vehicle control method, and a program.

BACKGROUND ART

In the related art, a control device that, when a predetermined operation is performed with respect to a faulty lighting fixture in which a failure has been detected, turns on a substitute lighting fixture substituting the faulty lighting fixture in the form set to the faulty lighting fixture is disclosed (refer to Patent Document 1).

CITATION LIST

[Patent Document]
[Patent Document 1]
Japanese Unexamined Patent Application, First Publication No. 2016-20189

SUMMARY OF INVENTION

Technical Problem

In technologies in the related art, there have been cases in which a vehicle cannot be appropriately controlled.

The present invention has been made in consideration of such circumstances, and an object thereof is to provide a vehicle control device, a vehicle system, a vehicle control method, and a program capable of more appropriately controlling a vehicle.

Solution to Problem

A vehicle control device according to this invention employs the following constitutions.

(1): According to an aspect of this invention, there is provided a vehicle control device including a recognizer configured to recognize surrounding circumstances of a vehicle; a driving controller configured to control one of or both steering and acceleration/deceleration of the vehicle; and a mode determinator configured to determine any of a plurality of driving modes including a first driving mode and a second driving mode as a driving mode of the vehicle, in which tasks imposed on a driver in the second driving mode are less significant than in the first driving mode and one of or both steering and acceleration/deceleration of the vehicle are controlled by the driving controller, the driving controller controls the vehicle in the second driving mode, and the driving mode is changed to the first driving mode when an abnormality occurs in a combination switch, combination switch related equipment which is connected between the driving controller and the combination switch via a communication line, or communication which is performed by the combination switch and the driving controller.

(2): According to the aspect of the foregoing (1), the second driving mode is a mode in which a task of monitoring a side in front thereof and a task of grasping a steering wheel are not imposed on the driver. The first driving mode is a mode in which the vehicle is controlled by a driving operation of the driver.

(3): According to the aspect of the foregoing (1) or (2), the combination switch is provided in a steering wheel of the vehicle or in the vicinity of the steering wheel and includes a switch for operating at least headlights, direction indicators, and windshield wipers of the vehicle.

(4): According to any of the aspects of the foregoing (1) to (3), the combination switch related equipment includes at least one of an instrument device which controls an instrument connected between the driving controller and the combination switch via a communication line, a control device which is connected between the driving controller and the combination switch via a communication line and controls target equipment for an operation performed with respect to the combination switch on the basis of the operation, and a driver which drives target equipment for the operation on the basis of an operation of the combination switch.

(5): According to any of the aspects of the foregoing (1) to (4), the mode determinator judges that the abnormality has occurred when information indicating that a switch included in the combination switch has failed or information indicating that the combination switch related equipment has failed is continuously acquired for a first time or longer.

(6): According to the aspect of the foregoing (5), the mode determinator starts to judge whether or not the abnormality has occurred when a state in which a voltage input to the driving controller is a first voltage or higher has continued for the first time, a communication state between the combination switch related equipment and the driving controller is normal, and no abnormality has occurred in a communication state between the combination switch related equipment and the combination switch.

(7): According to another aspect of this invention, there is provided a vehicle system including a vehicle control device configured to include a recognizer that recognizes surrounding circumstances of a vehicle, a driving controller that controls one of or both steering and acceleration/deceleration of the vehicle, and a mode determinator that determines any of a plurality of driving modes including a first driving mode and a second driving mode as a driving mode of the vehicle, in which tasks imposed on a driver in the second driving mode are less significant than in the first driving mode and one of or both steering and acceleration/deceleration of the vehicle are controlled by the driving controller, the driving controller controls the vehicle in the second driving mode, and the driving mode is changed to the first driving mode when an abnormality occurs in a combination switch, an instrument device, a control device, or communication which is performed by the combination switch and the driving controller; the instrument device configured to be connected to the vehicle control device via a first communication line, communicate with the vehicle control device on the basis of a first communication protocol, and control an instrument; the control device configured to be connected to the instrument device via a second communication line, communicate with the instrument device on the basis of a second communication protocol, and control target equipment for an operation performed with respect to the combination switch on the basis of the operation; and a combination switch configured to be connected to the control device via a third communication line, communicate with the control device on the basis of the second communication protocol, and output a signal corresponding to an operation of an occupant of the vehicle to the control device.

(8): According to another aspect of this invention, there is provided a vehicle control method in which a computer mounted in a vehicle recognizes surrounding circumstances of the vehicle, controls one of or both steering and acceleration/deceleration of the vehicle, and determines any of a plurality of driving modes including a first driving mode and a second driving mode as a driving mode of the vehicle, in which tasks imposed on a driver in the second driving mode are less significant than in the first driving mode and one of or both steering and acceleration/deceleration of the vehicle are controlled without depending on an operation of the driver of the vehicle, the vehicle is controlled in the second driving mode, and the driving mode is changed to the first driving mode when an abnormality occurs in a combination switch, combination switch related equipment which is connected between the computer and the combination switch via a communication line, or communication which is performed by the combination switch and the computer.

(9): According to another aspect of this invention, there is provided a program causing a computer mounted in a vehicle to recognize surrounding circumstances of the vehicle, to control one of or both steering and acceleration/deceleration of the vehicle, and to determine any of a plurality of driving modes including a first driving mode and a second driving mode as a driving mode of the vehicle, in which tasks imposed on a driver in the second driving mode are less significant than in the first driving mode and one of or both steering and acceleration/deceleration of the vehicle are controlled without depending on an operation of the driver of the vehicle, the vehicle is controlled in the second driving mode, and the driving mode is changed to the first driving mode when an abnormality occurs in a combination switch, combination switch related equipment which is connected between the computer and the combination switch via a communication line, or communication which is performed by the combination switch and the computer.

Advantageous Effects of Invention

According to the aspects of the foregoing (1) to (9), a vehicle can be more appropriately controlled by changing the driving mode to the first driving mode when an abnormality has occurred.

BRIEF DESCRIPTION OF DRAWINGS

FIG. 3 is a view showing an example of correspondences of driving modes, control states of a host vehicle, and tasks.

FIG. 4 is a view showing an example of correspondences of driving modes, control states of a vehicle M, and tasks.

FIG. 7 is an explanatory view of conditions for judging an abnormality and estimated abnormalities.

FIG. 8 is an explanatory view of conditions for starting judgment of (1) to (5) in FIG. 7.

DESCRIPTION OF EMBODIMENT

Hereinafter, with reference to the drawings, an embodiment of a vehicle control device, a vehicle control method, and a program of the present invention will be described.

[Overall Constitution]

Figure 1:
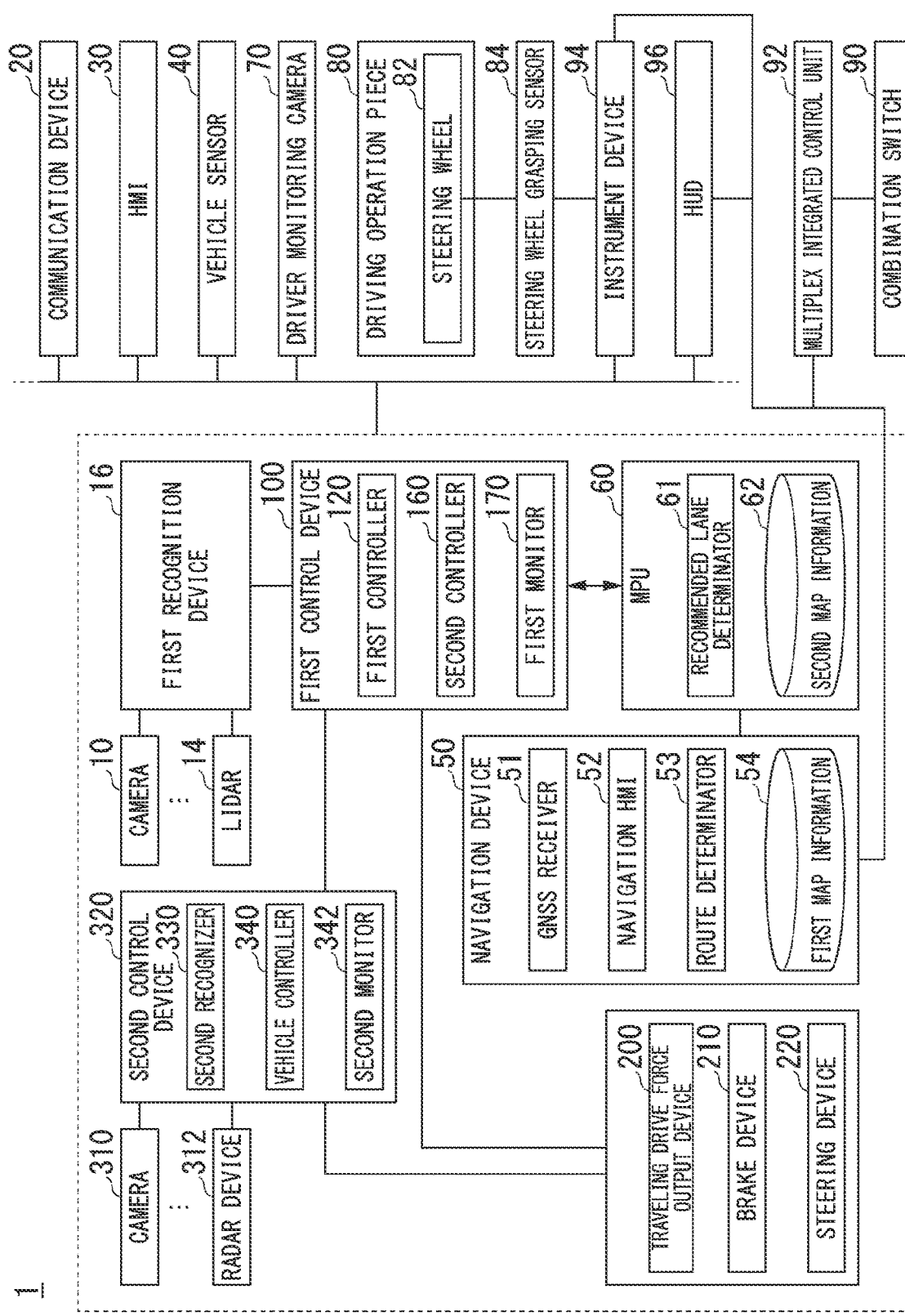
FIG. 1 is a view of a constitution of a vehicle system utilizing a vehicle control device according to an embodiment.

FIG. 1 is a view of a constitution of a vehicle system 1 utilizing a vehicle control device according to an embodiment. For example, a vehicle having the vehicle system 1 mounted therein is a vehicle having two wheels, three wheels, or four wheels, and a drive source thereof is an internal-combustion engine such as a diesel engine or a gasoline engine, an electric motor, or a combination of these. An electric motor operates using power generated by a generator interlinked to the internal-combustion engine, or discharge power of a secondary battery or a fuel cell. In the following description, a vehicle will be described as a four-wheeled hybrid vehicle having an internal-combustion engine and an electric motor as driving sources.

In the vehicle system 1, functions for controlling the vehicle are multiplexed or made redundant in a first group and a second group which will be described below. Accordingly, the reliability of the vehicle system 1 is improved.

For example, the vehicle system 1 includes a camera 10, a light detection and ranging (LIDAR) 14, a first recognition device 16, a communication device 20, a human machine interface (HMI) 30, a vehicle sensor 40, a navigation device 50, a map positioning unit (MPU) 60, a driver monitoring camera 70, a driving operation piece 80, a combination switch 90, a multiplex integrated control unit (MICU) 92, an instrument device 94, a head up display (HUD) 96, a first control device 100, a traveling drive force output device 200, a brake device 210, and a steering device 220.

Moreover, for example, the vehicle system 1 includes a camera 310, a radar device 312, and a second control device 320.

These devices and equipment are connected to each other through a multiplex communication line such as a controller area network (CAN) communication line, a serial communication line, a radio communication network, or the like. The constitutions shown in FIG. 1, and FIGS. 3 and 5 (which will be described below) are merely examples. A part of the constitutions may be omitted, and other constitutions may be added thereto. In addition, the connection forms of communication lines shown in FIG. 1, and FIGS. 3 and 5 (which will be described below) are merely examples, and the connection forms may be suitably changed. Moreover, the functional constitutions may be integrated or may be provided in a dispersed manner. The vehicle system 1 is sorted into functional constitutions included in the first group and functional constitutions included in the second group. Details of the first group and the second group will be described below (refer to FIG. 5). In addition, the vehicle system 1 includes, in addition to those shown in FIG. 1, for example, a sound navigation and ranging (SONAR) for detecting an object at a short distance, a multiview camera for capturing images around the vehicle, and the like. However, depiction of these will be omitted.

For example, the camera 10 is a digital camera utilizing a solid-state image capturing element such as a charge coupled device (CCD) or a complementary metal oxide semiconductor (CMOS). The camera 10 is attached to an arbitrary part in the vehicle having the vehicle system 1 mounted therein (hereinafter, a vehicle M). When images of the side in front thereof are captured, the camera 10 is attached to an upper portion in a front windshield, a rear surface of a rearview mirror, or the like. For example, the camera 10 periodically and repeatedly captures images of an area around the vehicle M. The camera 10 may be a stereo camera.

The LIDAR 14 emits light (or electromagnetic waves having wavelengths close to that of light) to the area around the vehicle M and measures scattered light. The LIDAR 14 determines a distance to a target on the basis of a time from light emission to light reception. For example, emitted light is pulsed laser light. The LIDAR 14 is attached to an arbitrary part in the vehicle M.

The first recognition device 16 recognizes a position, a kind, a speed, and the like of an object by performing sensor fusion processing with respect to detection results of some or all of the camera 10 and the LIDAR 14 and outputs recognition results to the first control device 100. The first recognition device 16 may output detection results of the camera 10 and the LIDAR 14 to the first control device 100 without any change. The first recognition device 16 may be omitted from the vehicle system 1. The first recognition device 16 may perform the sensor fusion processing further using detection results of the radar device 312.

For example, the communication device 20 communicates with other vehicles present in the area around the vehicle M utilizing a cellular network, a Wi-Fi network, Bluetooth (registered trademark), dedicated short range communication (DSRC), or the like, or communicates with various server devices via radio base stations.

The HMI 30 presents various kinds of information to an occupant of the vehicle M and receives an input operation performed by the occupant. The HMI 30 includes various display devices, a speaker, a buzzer, a touch panel, a switch, a key, and the like. The HMI 30 may include a predetermined outputter which is provided in a steering wheel and prompts the occupant to grasp the steering wheel, or an HUD.

The vehicle sensor 40 includes various sensors used for controlling the vehicle M, such as a vehicle speed sensor for detecting a speed of the vehicle M, an acceleration sensor for detecting an acceleration, a yaw rate sensor for detecting an angular velocity around a vertical axis, and an azimuth sensor for detecting a direction of the vehicle M.

For example, the navigation device 50 includes a global navigation satellite system (GNSS) receiver 51, a navigation HMI 52, and a route determinator 53. The navigation device 50 retains first map information 54 in a storage device such as a hard disk drive (HDD) or a flash memory. The GNSS receiver 51 identifies the position of the vehicle M on the basis of a signal received from a GNSS satellite. The position of the vehicle M may be identified or complemented by an inertial navigation system (INS) utilizing an output of the vehicle sensor 40. The navigation HMI 52 includes a display device, a speaker, a touch panel, a key, and the like. A part or the entirety of the navigation HMI 52 may be shared as the HMI 30 described above. For example, with reference to the first map information 54, the route determinator 53 determines a route from the position of the vehicle M (or an arbitrary input position) identified by the GNSS receiver 51 to a destination input by the occupant using the navigation HMI 52 (hereinafter, a route on the map). For example, the first map information 54 is information in which road shapes are expressed by links indicating roads and nodes connected to each other by the links. The first map information 54 may include curvatures of roads, information of point of interest (POI), and the like. The route on the map is output to the MPU 60. The navigation device 50 may perform route guiding using the navigation HMI 52 on the basis of the route on the map. For example, the navigation device 50 may be realized by a function of a terminal device such as a smartphone or a tablet terminal carried by the occupant. The navigation device 50 may transmit a current position and a destination to a navigation server via the communication device 20 and acquire a route equivalent to the route on the map from the navigation server.

For example, the MPU 60 includes a recommended lane determinator 61 and retains second map information 62 in a storage device such as an HDD or a flash memory. The recommended lane determinator 61 divides a route on the map provided from the navigation device 50 into a plurality of blocks (for example, divides a route on the map by 100 [m] in a vehicle forward traveling direction) and determines a recommended lane for each block with reference to the second map information 62. The recommended lane determinator 61 determines which lane from the left to travel. When a branch point is present in the route on the map, the recommended lane determinator 61 determines a recommended lane such that the vehicle M can travel in a reasonable route for traveling forward to a branch location. In addition, the MPU 60 recognizes the position of the vehicle M on the basis of detection results of a gyro sensor (not shown), the position of the vehicle M identified by the GNSS receiver 51, and the like.

The second map information 62 is more detailed map information than the first map information 54. For example, the second map information 62 includes information of the centers of lanes, information of boundaries of lanes, and the like. In addition, the second map information 62 may include road information, traffic regulation information, address information (addresses and zip codes), facility information, phone number information, and the like. The second map information 62 may be updated at any time by the communication device 20 through communication with other devices. Information indicating positions or ranges of zebra zones (buffer zones) is stored in the second map information 62. Zebra zones are road signs for inducing traveling of the vehicle M. For example, zebra zones are signs expressed by a stripe pattern.

For example, the driver monitoring camera 70 is a digital camera utilizing a solid-state image capturing element such as a CCD or a CMOS. The driver monitoring camera 70 is attached to an arbitrary part in the vehicle M in a position and a direction in which an image of the head of the occupant (hereinafter, the driver) seated in a driver's seat of the vehicle M can be captured from the front (in a direction in which an image of the face is captured). For example, the driver monitoring camera 70 is attached to an upper portion of the display device provided in a central portion of an instrument panel of the vehicle M.

For example, in addition to a steering wheel 82, the driving operation piece 80 includes an accelerator pedal, a brake pedal, a shift lever, and other operation pieces. A sensor for detecting an operation amount or the presence or absence of an operation is attached to the driving operation piece 80, and detection results thereof are output to the first control device 100 and the second control device 320, or some or all of the traveling drive force output device 200, the brake device 210, and the steering device 220. A steering wheel grasping sensor 84 is attached to the steering wheel 82. The steering wheel grasping sensor 84 is realized by an electrostatic capacity sensor or the like and outputs a signal capable of detecting whether or not the driver is grasping the steering wheel 82 (is in contact with the steering wheel 82 in a state in which a force can be applied thereto) to the first control device 100 or the second control device 320.

Figure 2:
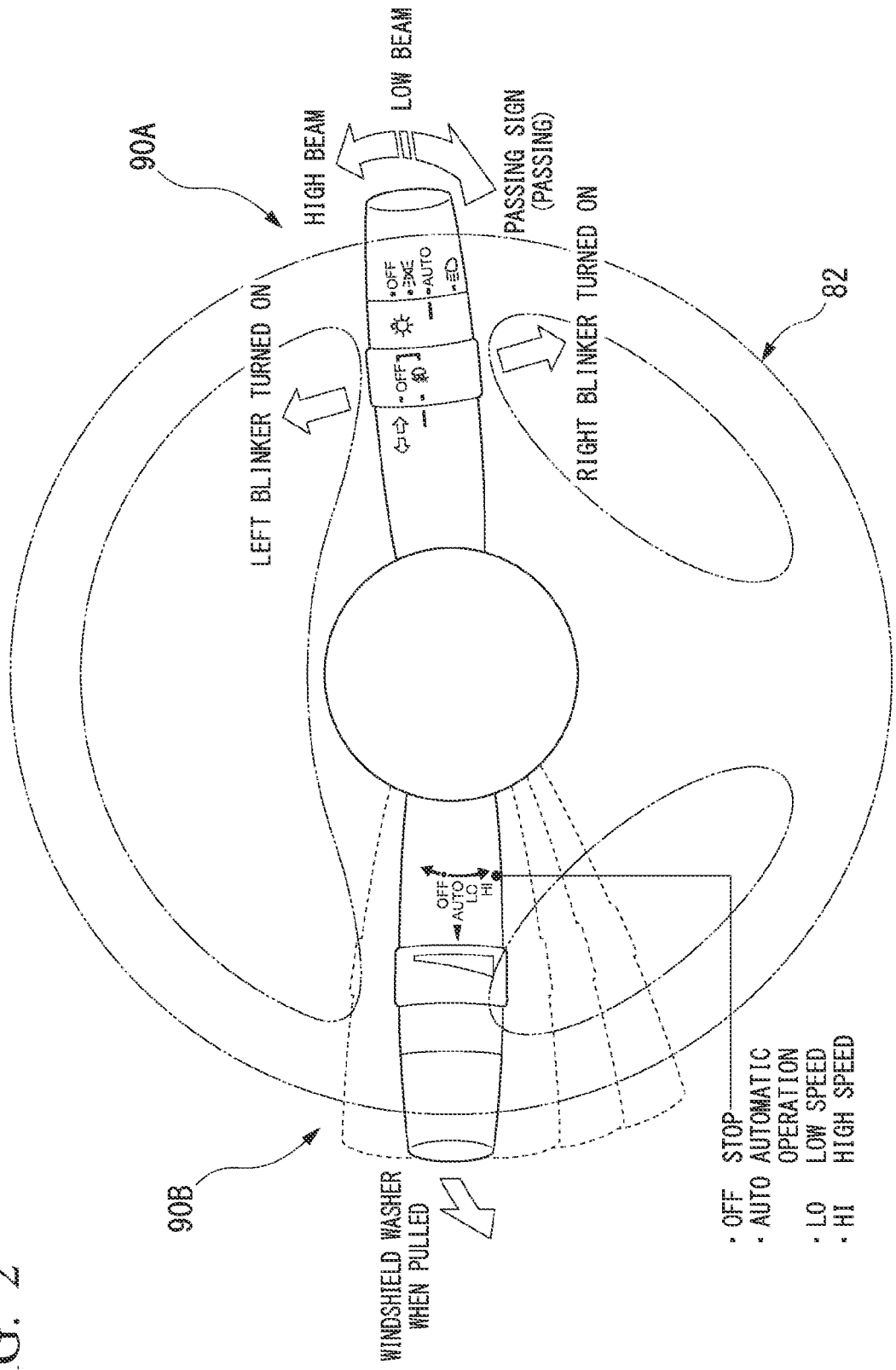
FIG. 2 is a view of a functional constitution of a first controller and a second controller.

For example, the combination switch 90 is provided in the steering wheel or in the vicinity of the steering wheel (for example, a steering column). FIG. 2 is a view showing an example of the combination switch 90. For example, the combination switch 90 includes a first operation lever 90A and a second operation lever 90B. For example, the first operation lever 90A is a lever for adjusting a light-on state of lights (for example, headlights, vehicle width lights, and fog lamps). The light-on state of the lights is controlled by an auto mode or a manual mode. The auto mode is a mode in which the vehicle M automatically controls the light-on state of the lights on the basis of an illuminance detected by an illuminance sensor. The manual mode is a mode in which the light-on state of the lights is controlled on the basis of an operation performed by the occupant with respect to the first operation lever 90A.

The first operation lever 90A functions as a lever for further operating the light-on state of blinkers. When the first operation lever 90A is operated in order to turn on the blinkers (for example, when an operation for a lane change in the right direction is performed for passing), information corresponding to the operation is transmitted to the first control device 100 via a multiplex integrated control unit 92. For example, the first control device 100 performs automated lane change in accordance with the transmitted information.

For example, the second operation lever 90B is a lever for adjusting a working state of windshield wipers. The working state of the windshield wipers is controlled by an auto mode or a manual mode. The auto mode is a mode in which the vehicle M automatically controls the working state of the windshield wipers on the basis of an amount of rainfall detected by a rain sensor. The manual mode is a mode in which the working state of the windshield wipers is controlled on the basis of an operation performed by the occupant with respect to the second operation lever 90B.

In FIG. 1, the multiplex integrated control unit 92 controls the blinkers, the lights, the windshield wipers, power windows, door locks, and the like. For example, the multiplex integrated control unit 92 controls the light-on state of the lights or the light-on state of the blinkers in accordance with an operation performed with respect to the first operation lever 90A. For example, the multiplex integrated control unit 92 controls the working state of the windshield wipers by driving a driver transmitting a dynamic force to the windshield wipers in accordance with an operation performed with respect to the second operation lever 90B.

The instrument device 94 includes a meter panel and a controller controlling the meter panel. The meter panel is provided in the instrument panel on a side in front of the driver's seat and provides information such as the speed of the vehicle M, the working state of the driving source, residual fuel, and the like to the occupant. The controller of the instrument device 94 controls the instrument panel on the basis of information acquired from various sensors and other controllers provided in the vehicle M.

For example, the HUD 96 allows the eyes of the occupant seated in the driver's seat to visually recognize a virtual image by projecting an image onto a part of the front windshield on the side in front of the driver's seat. For example, the HUD 96 allows the occupant to visually recognize information for assisting driving. For example, information for assisting driving indicates a vehicle speed and a direction of a destination. The HUD 96 is controlled by a control device (not shown) or the first control device 100.

For example, the first control device 100 includes a first controller 120, a second controller 160, and a first monitor 170. For example, each of the first controller 120, the second controller 160, and the first monitor 170 is realized by a hardware processor such as a central processing unit (CPU) executing a program (software). Some or all of these constituent elements may be realized by hardware (a circuit; including circuitry) such as a large-scale integration (LSI), an application specific integrated circuit (ASIC), a field-programmable gate array (FPGA), or a graphics processor (GPU), or may be realized by software and hardware in cooperation. A program may be stored in a device such as an HDD or a flash memory (a storage device including a non-transitory storage medium) of the first control device 100 in advance or may be stored in an attachable/detachable storage medium such as a DVD or a CD-ROM such that the program is installed in the HDD or the flash memory of the first control device 100 when the storage medium (non-transitory storage medium) is mounted in a drive device.

FIG. 3 is a view of a functional constitution of the first controller 120 and the second controller 160. For example, the first controller 120 includes a recognizer 130, an action plan generator 140, and a mode determinator 150. For example, the first controller 120 realizes a function based on artificial intelligence (AI) and a function based on a model given in advance in parallel. For example, the function of "recognition of an intersection" may be realized by executing recognition of an intersection based on deep learning or the like and recognition based on conditions given in advance (including signals allowing pattern matching, road signs, and the like) in parallel and scoring both for comprehensive evaluation. Accordingly, the reliability of automated driving is secured.

The recognizer 130 recognizes states of the position, the speed, the acceleration, and the like of an object in the area around the vehicle M on the basis of the information input from the camera 10 and the LIDAR 14 via the first recognition device 16. For example, the position of an object is recognized as a position on absolute coordinates having a representative point (the center of gravity, the center of a drive shaft, or the like) of the vehicle M as an origin and is used for control. The position of an object may be expressed by a representative point of the center of gravity of the object, a corner, or the like or may be expressed by a region. A "state" of an object may include an acceleration or a jerk of the object, or "an action state" (for example, whether or not a lane change is performed or attempted).

For example, the recognizer 130 recognizes a lane in which the vehicle M is traveling (traveling lane). For example, the recognizer 130 recognizes a traveling lane by comparing a pattern of road demarcation lines obtained from the second map information 62 (for example, an array of solid lines and dotted lines) with a pattern of road demarcation lines in the area around the vehicle M recognized from an image captured by the camera 10. The recognizer 130 may recognize a traveling lane by recognizing a course boundary (road boundary) including road demarcation lines, shoulders of a road, curbstones, median strips, guardrails, and the like, without being limited to road demarcation lines. In this recognition, the position of the vehicle M acquired from the navigation device 50 or processing results of the INS may be added. In addition, the recognizer 130 recognizes stop signs, obstacles, red signals, tollgates, and other road events.

When a traveling lane is recognized, the recognizer 130 recognizes a position or a posture of the vehicle M with respect to the traveling lane. For example, the recognizer 130 may recognize a discrepancy of a reference point in the vehicle M from the center of the lane and an angle formed with respect to a line obtained by connecting the centers of the lane in the forward traveling direction of the vehicle M as a relative position and a posture of the vehicle M with respect to the traveling lane. In place of this, the recognizer 130 may recognize the position of the reference point in the vehicle M or the like with respect to any side end portion of the traveling lane (a road demarcation line or a road boundary) as a relative position of the vehicle M with respect to the traveling lane.

In principle, the action plan generator 140 generates a target trajectory in which the vehicle M will automatically travel (without depending on an operation of the driver) in the future such that the vehicle M travels in a recommended lane determined by the recommended lane determinator 61 and can also cope with surrounding circumstances of the vehicle M. For example, a target trajectory includes a speed factor. For example, a target trajectory is expressed as arrival target points (trajectory points) of the vehicle M arranged in order. Trajectory points are arrival target points of the vehicle M for each predetermined traveling distance (for example, approximately several meters) by a distance along the road. In addition to this, a target speed and a target acceleration for each predetermined sampling time (for example, approximately several tenths of a second) are generated as a part of the target trajectory. In addition, the trajectory points may be arrival target positions of the vehicle M at corresponding sampling times of respective predetermined sampling times. In this case, information of the target speed and the target acceleration is expressed by an interval between the trajectory points.

When a target trajectory is generated, the action plan generator 140 may set an event of automated driving. An event of automated driving includes a constant speed traveling event, a low speed following traveling event, a lane change event, a branching event, a merging event, a takeover event, and the like. The action plan generator 140 generates a target trajectory corresponding to an activated event.

The mode determinator 150 determines any of a plurality of driving modes having different tasks imposed on the driver as a driving mode of the vehicle M. For example, the mode determinator 150 includes a driver state judger 152, a mode change processor 154, and an abnormality judger 156. Individual functions thereof will be described below.

FIG. 4 is a view showing an example of correspondences of driving modes, control states of the vehicle M, and tasks. For example, regarding the driving mode of the vehicle M, there are five modes including a mode A to a mode E. The control state, that is, the degree of automation in driving control of the vehicle M is the highest in the mode A, sequentially becomes lower in the order of the mode B, the mode C, and the mode D, and is the lowest in the mode E. On the contrary, tasks imposed on the driver are the least significant in the mode A, sequentially become more significant in the order of the mode B, the mode C, and the mode D, and are the most significant in the mode E. In the modes D and E, since the control state is not automated driving, the first control device 100 has a duty of ending control related to automated driving and shifting to driving assistance or manual driving. Hereinafter, details of each of the driving modes will be described as an example.

In the mode A, the vehicle M is in a state of automated driving, and both front side monitoring (or monitoring the area around the vehicle M) and grasping of the steering wheel 82 (in the diagram, steering wheel grasping) are not imposed on the driver. However, even in the mode A, the driver is required to be in a posture capable of quickly shifting to manual driving in response to a request from the system centered on the first control device 100. The aforementioned automated driving denotes that both steering and acceleration/deceleration are controlled without depending on an operation of the driver. The front side denotes a space visually recognized in the forward traveling direction of the vehicle M via the front windshield. For example, the mode A is a driving mode which can be executed on a motorway such as an expressway when the vehicle M is traveling at a predetermined speed (for example, approximately 50 [km/h]) or slower and conditions such as a preceding vehicle (following target) being present are satisfied, and it may also be referred to as a traffic jam pilot (TJP). When the conditions are no longer satisfied, the mode determinator 150 changes the driving mode of the vehicle M to the mode B.

In the mode B, the vehicle M is in a state of driving assistance, and a task of monitoring the side in front of the vehicle M (hereinafter, front side monitoring) is imposed (or monitoring of the area around the vehicle M is imposed) on the driver, but a task of grasping the steering wheel 82 is not imposed. In the mode C, the vehicle M is in a state of driving assistance, and the task of monitoring the side in front thereof and the task of grasping the steering wheel 82 are imposed on the driver. The mode D is a driving mode requiring a driving operation by the driver to a certain extent regarding at least one of steering and acceleration/deceleration of the vehicle M. For example, in the mode D, driving assistance such as adaptive cruise control (ACC) or a lane keeping assist system (LKAS) is performed. In the mode E, the vehicle M is in a state of manual driving requiring a driving operation by the driver for both steering and acceleration/deceleration. In both the mode D and the mode E, as a matter of course, the task of monitoring the side in front of the vehicle M is imposed on the driver. In each mode, in place of front side monitoring, surroundings monitoring may be imposed. The term "surroundings" denotes a space around the host vehicle M visually recognized by the driver at the time of manual driving. In the following description, it will be described on the assumption that "front side monitoring" is imposed.

The first control device 100 (and a driving assistance device (not shown)) executes automated lane change corresponding to the driving mode. Automated lane change includes automated lane change (1) based on a request of the system, and automated lane change (2) based on a request of the driver. The automated lane change (1) includes automated lane change for passing performed when the speed of a preceding vehicle is lower than a criterion compared to the speed of the host vehicle, and automated lane change for travelling forward toward a destination (automated lane change based on change of a recommended lane). In the automated lane change (2), lane change of the host vehicle M is performed in an operation direction when a direction indicator is operated by the driver in a case in which conditions related to the speed, the positional relationship with respect to surrounding vehicles, and the like are satisfied.

In the mode A, the first control device 100 executes neither of the automated lane changes (1) and (2). In the modes B and C, the first control device 100 executes both the automated lane changes (1) and (2). In the mode D, the driving assistance device (not shown) does not execute the automated lane change (1) but executes the automated lane change (2). In the mode E, neither of the automated lane changes (1) and (2) is executed.

When tasks related to a determined driving mode (hereinafter, a current driving mode) are not being executed by the driver, the mode determinator 150 changes the driving mode of the vehicle M to a driving mode having more significant tasks.

For example, in the mode A, when the driver is in a posture incapable of shifting to manual driving in response to a request from the system (for example, when the driver continues an action of looking aside other than an allowable area or when a sign indicating difficulty in performing driving is detected), the mode determinator 150 prompts the driver to shift to manual driving using the HMI 30 or the predetermined outputter prompting the occupant to grasp the steering wheel. If the driver does not comply therewith, the mode determinator 150 performs control such as pulling over the vehicle M to a shoulder of the road, gradually stopping the vehicle M, and stopping the automated driving. After automated driving is stopped, the vehicle M is in a state of the mode D or E, and the vehicle M can be started by a manual operation of the driver. Hereinafter, the same applies to the case regarding "stopping automated driving". In the mode B, when the driver is not monitoring the side in front thereof, the mode determinator 150 prompts the driver to monitor the side in front thereof using the HMI 30 or the predetermined outputter. If the driver does not comply therewith, the mode determinator 150 performs control such as pulling over the vehicle M to a shoulder of the road, gradually stopping the vehicle M, and stopping the automated driving. In the mode C, when the driver is not monitoring the side in front thereof, or when the steering wheel 82 is not grasped, the mode determinator 150 prompts the driver to monitor the side in front thereof and/or to grasp the steering wheel 82 using the HMI 30 or the predetermined outputter. If the driver does not comply therewith, the mode determinator 150 performs control such as pulling over the vehicle M to a shoulder of the road, gradually stopping the vehicle M, and stopping the automated driving.

The driver state judger 152 monitors the state of the driver for the foregoing mode change and judges whether or not the state of the driver is a state corresponding to the task. For example, the driver state judger 152 performs posture estimation processing by analyzing an image captured by the driver monitoring camera 70 and judges whether or not the driver is in a posture incapable of shifting to manual driving in response to a request from the system. The driver state judger 152 performs visual line estimation processing by analyzing an image captured by the driver monitoring camera 70 and judges whether or not the driver is monitoring the side in front thereof.

The mode change processor 154 performs various kinds of processing for changing the mode. For example, the mode change processor 154 instructs the action plan generator 140 to generate a target trajectory for stopping at a shoulder of a road, instructs the driving assistance device (not shown) to operate, or controls the HMI 30 to prompt the driver to perform an action.

The abnormality judger 156 judges whether or not an abnormality has occurred in the combination switch 90, combination switch related equipment (the multiplex integrated control unit 92, the instrument device 94, and the control targets of the multiplex integrated control unit 92) which is connected between the first control device 100 and the combination switch 90 via a communication line, or communication which is performed by the combination switch 90 and the first control device 100. Details thereof will be described below.

In FIG. 3, the second controller 160 controls the traveling drive force output device 200, the brake device 210, and the steering device 220 such that the vehicle M passes through a target trajectory generated by the action plan generator 140 as scheduled.

For example, the second controller 160 includes an acquirer 162, a speed controller 164, and a steering controller 166. The acquirer 162 acquires information of a target trajectory (trajectory points) generated by the action plan generator 140 and stores it in a memory (not shown). The speed controller 164 controls the traveling drive force output device 200 via a drive ECU 252 (which will be described below) and controls the brake device 210 via a brake ECU (260 or 362) on the basis of the speed factor associated with the target trajectory stored in the memory. The steering controller 166 controls the steering device 220 via a steering ECU (250 or 350) in accordance with a curve state of the target trajectory stored in the memory. For example, the processing of the speed controller 164 and the steering controller 166 is realized by a combination of feedforward control and feedback control. As an example, the steering controller 166 executes feedforward control in accordance with the curvature of the road in front of the vehicle M and feedback control based on a discrepancy from the target trajectory in combination. The foregoing speed controller 164 may be integrated with the drive ECU 252 or the brake ECU. The foregoing steering controller 166 may be integrated with the steering ECU.

In FIG. 1, details of the first monitor 170 will be described below.

The traveling drive force output device 200 outputs a traveling drive force (torque) allowing the vehicle M to travel to drive wheels. For example, the traveling drive force output device 200 is a combination of an internal-combustion engine, an electric motor, a transmission, and the like.

For example, the brake device 210 includes a brake caliper, a cylinder transmitting a hydraulic pressure to the brake caliper, and an electric motor causing the cylinder to generate a hydraulic pressure. The brake device 210 may include a mechanism, as a backup, in which a hydraulic pressure generated by an operation of the brake pedal included in the driving operation piece 80 is transmitted to the cylinder via a master cylinder. The brake device 210 is not limited to the constitution described above and may be an electronic control hydraulic brake device in which an actuator is controlled in accordance with the information input from the second controller 160 and a hydraulic pressure of the master cylinder is transmitted to the cylinder.

For example, the steering device 220 includes an electric motor. For example, the electric motor changes the direction of steered wheels by causing a force to act by a rack-and-pinion mechanism.

For example, the camera 310 is a digital camera utilizing a solid-state image capturing element such as a CCD or a CMOS. The camera 310 is attached to an arbitrary part in the vehicle M. For example, the camera 310 periodically and repeatedly captures images of the area around the vehicle M. The camera 10 may be a stereo camera.

The radar device 312 radiates radio waves such as millimeter waves in the area around the vehicle M and detects at least a position of an object (a distance and an azimuth) by detecting radio waves (reflected waves) reflected by the object. The radar device 312 is attached to an arbitrary part in the vehicle M. The radar device 312 may detect a position and a speed of an object by a frequency modulated continuous wave (FM-CW) method.

For example, the second control device 320 includes a second recognizer 330, a vehicle controller 340, and a second monitor 342. For example, the second recognizer 330, the vehicle controller 340, and the second monitor 342 are realized by a hardware processor such as a CPU executing a program (software). Some or all of these constituent elements may be realized by hardware (a circuit; including circuitry) such as an LSI, an ASIC, an FPGA, or a GPU, or may be realized by software and hardware in cooperation. A program may be stored in a device such as an HDD or a flash memory (a storage device including a non-transitory storage medium) of the second control device 320 in advance or may be stored in an attachable/detachable storage medium such as a DVD or a CD-ROM such that the program is installed in the HDD or the flash memory of the second control device 320 when the storage medium (non-transitory storage medium) is mounted in the drive device.

The second recognizer 330 recognizes a position, a kind, a speed, and the like of an object by performing sensor fusion processing with respect to detection results of some or all of the camera 310 and the radar device 312.

The vehicle controller 340 executes automated driving of the vehicle M by executing processing similar to those of the first controller 120 and the second controller 160. However, the processing performance of the first controller 120 and the second controller 160 (the first control device 100) is higher than the processing performance of the vehicle controller 340 (the second control device 320). The reliability of the processing performance of the first controller 120 and the second controller 160 is higher than the reliability of the processing performance of the vehicle controller 340. For this reason, automated driving performed by the first controller 120 and the second controller 160 is smoother than automated driving performed by the vehicle controller 340. Details of the second monitor 342 will be described below.

[First Group and Second Group]

Figure 5:
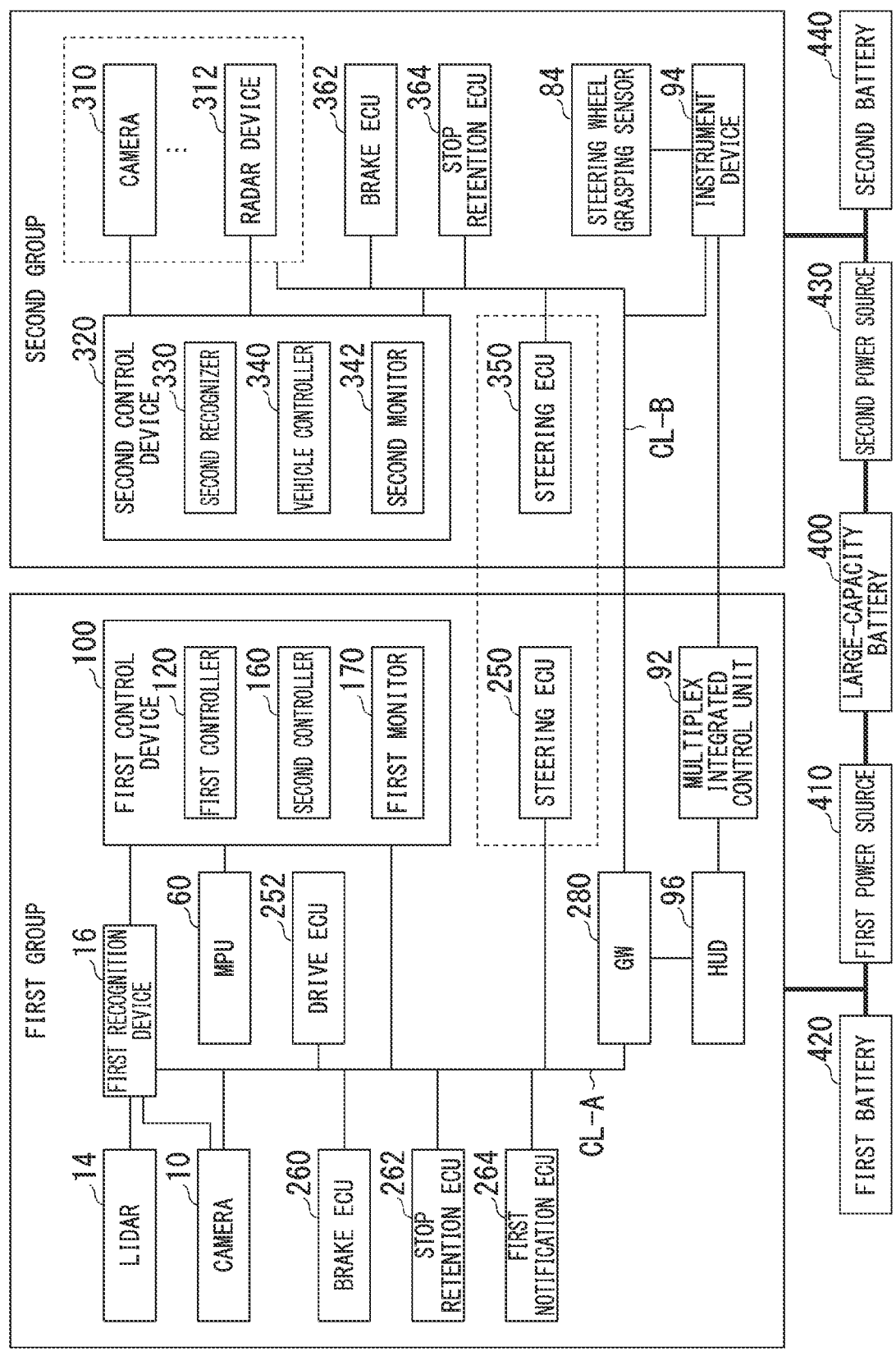
FIG. 5 is a view showing a vehicle system 1 from another point of view.

FIG. 5 is a view showing the vehicle system 1 from another point of view. With reference to FIG. 5, the first group and the second group will be described. A description of the functional constitutions which have been described in FIGS. 1 and 3 will be omitted.

(First Group)

The camera 10, the LIDAR 14, the first recognition device 16, the MPU 60, the first control device 100, a steering electronic control unit (ECU) 250, the drive ECU 252, the brake ECU 260, a stop retention ECU 262, a first notification ECU 264, the multiplex integrated control unit 92, the HUD 96, the multiplex integrated control unit 92, and a GW 280 are included in the first group, for example.

The steering ECU 250 controls the steering device 220 in association with the first control device 100. The steering ECU 250 changes the direction of the steered wheels by driving the electric motor in accordance with the information input from the second controller 160. The steering ECU 250 controls steering in accordance with an operation of the driver with respect to the steering wheel. The steering ECU 250 controls steering using information input from an electric motor outputting a drive force for steering, a sensor for determining the amount of rotation of the electric motor, or a torque sensor for detecting a steering torque, or provides these pieces of information to the second controller 160.

The drive ECU 252 controls the traveling drive force output device 200 in association with the first control device 100. The drive ECU 252 controls the traveling drive force output device 200 in accordance with the information input from a sensor provided in the driving operation piece 80. For example, the drive ECU 252 controls the internal-combustion engine or the electric motor or switches a gear stage of an automatic transmission on the basis of the amount of operation of the accelerator pedal, the amount of operation of the brake pedal, or information input from a sensor for detecting the vehicle speed.

The brake ECU 260 controls the brake device 210 in association with the first control device 100. The brake ECU 260 controls the electric motor in accordance with the information input from the second controller 160 such that a brake torque corresponding to a braking operation is output to each wheel. For example, the brake ECU 260 and the brake device 210 function as an electric servo brake (ESB). For example, the brake ECU 260 controls a distribution of a braking force by the brake device 210 and a braking force from regenerative braking of the electric motor.

The stop retention ECU 262 controls an electric parking lock device provided in the automatic transmission. For example, when a P range (parking range) is selected, the electric parking lock device locks an internal mechanism of the automatic transmission.

The first notification ECU 264 controls an in-vehicle outputter notifying the inside of the vehicle of information. For example, the in-vehicle outputter includes an outputter provided in the steering wheel. For example, this outputter is turned on when there is a need for the occupant of the vehicle M to grasp the steering wheel. In addition, the in-vehicle outputter also includes a mechanism for prompting the occupant to grasp the steering wheel or perform a predetermined operation by vibrating a seatbelt.

The GW 280 relays a communication line CL-A and a communication line CL-B. For example, the camera 10, the first recognition device 16, the first control device 100, the drive ECU 252, the brake ECU 260, the stop retention ECU 262, the first notification ECU 264, and an external notification ECU 266 are connected to the communication line CL-A. For example, the camera 310, the radar device 312, the second control device 320, the brake ECU 362, a stop retention ECU 364, and a second notification ECU 366 are connected to the communication line CL-B.

The HUD 96 is connected to the GW 280 via a communication line. The multiplex integrated control unit 92 is connected to the HUD 96 and is also connected to the instrument device 94 of the second group.

(Second Group)

The steering wheel grasping sensor 84, the instrument device 94, the camera 310, the radar device 312, the second control device 320, the steering ECU 350, the brake ECU 362, the stop retention ECU 364, the steering wheel grasping sensor 84, and the instrument device 94 are included in the second group, for example.

The steering ECU 350 controls the steering device 220 in association with a second control device 300. The steering ECU 250 controls steering using information input from the electric motor outputting a drive force for steering, the sensor for detecting the amount of rotation of the electric motor, or the torque sensor for detecting a steering torque.

The brake ECU 362 controls the brake device 210 in association with the second control device 300. The brake ECU 362 controls the electric motor in accordance with the information input from the vehicle controller 340 such that a brake torque corresponding to a braking operation is output to each wheel. The brake ECU 362 realizes vehicle stability assist (VSA). The brake ECU 362 curbs occurrence of skidding due to the wheels locked when braked suddenly or braked on a low-friction road on the basis of detection results of the yaw rate sensor or the acceleration sensor, curbs wheel slip with no traction at the time of starting or at the time of stopping, and also curbs occurrence of sideslip by controlling the posture of the vehicle M at the time of turning.

The stop retention ECU 364 maintains a stopped state of the vehicle M by controlling an electric parking brake (EPB). The electric parking brake has a mechanism for locking the rear wheels. The stop retention ECU 364 locks or unlocks the rear wheels by controlling the electric parking brake.

The steering wheel grasping sensor 84 is connected to the instrument device 94 via a communication line. The instrument device 94 is connected to the communication line CL-B and is further connected to the multiplex integrated control unit 92 as described above.

[First Monitor and Second Monitor]

The first monitor 170 monitors the states of some or all of the functional constitutions (devices having the functional constitutions) included in the second group connected thereto via the GW 280. For example, the first monitor 170 acquires information transmitted from a communication counterpart device and judges whether or not an abnormality is present in the communication counterpart device on the basis of the acquired information. For example, a state in which an abnormality is present indicates a state in which a communication counterpart device cannot be controlled in a state intended by the second control device 320. For example, a state in which an abnormality is present includes a flawed device, a device with a functional flaw, functional deterioration, a state in which communication with a device differs from a criterion communication state, and the like. Information transmitted by the communication counterpart device is results of self-diagnosis of the connection counterpart device or a predetermined flag transmitted from the connection counterpart device. For example, when results of self-diagnosis indicating an abnormality or information including a flag indicating an abnormality is transmitted from the connection counterpart device, the first monitor 170 judges that an abnormality is present in the communication counterpart device. In addition, when in a state in which communication with the connection counterpart device cannot be performed or a state in which communication is delayed, the first monitor 170 may judge that there is an abnormality in the communication counterpart device.

The second monitor 342 monitors the states of some or all of the functional constitutions included in the first group connected thereto via the GW 280. The second monitor 342 acquires information transmitted from a communication counterpart device and judges whether or not an abnormality is present in the communication counterpart device on the basis of the acquired information. For example, a state in which an abnormality is present indicates a state in which a communication counterpart device cannot be controlled in a state intended by the first control device 100. For example, a state in which an abnormality is present includes a flaw of a device, a functional flaw of a device, functional deterioration, a state in which communication with a device differs from a criterion communication state, and the like. For example, a state in which a communication counterpart device is abnormal includes a state similar to the state which has been described in description of the first monitor 170.

When an abnormality occurs in the equipment or the devices included in the first group, the second control device 320 executes automated driving in place of the first control device 100. For example, when an abnormality has occurred in the steering ECU 250, the brake ECU 260, and the stop retention ECU 262 of the equipment or the devices included in the first group or in the equipment or the device which is a control target of these, the second control device 320 executes automated driving by controlling the steering ECU 350, the brake ECU 362, the stop retention ECU 364, or the equipment or the device which is a control target of these. For example, automated driving in this case is automated driving in a fail operation function (FOF) mode (degeneration control mode). The FOF mode is a mode in which the vehicle system 1 requests manual operation of the vehicle M from the driver and performs control for a predetermined time (or a predetermined distance) such that the vehicle M does not deviate from the road and the vehicle M does not come excessively close to surrounding vehicles. When a manual operation is not performed for a predetermined time, the vehicle system 1 stops the vehicle M as it is by decelerating the vehicle M or stops the vehicle M at a position where it can stop.

[Power Source]

Moreover, for example, the vehicle system 1 includes a large-capacity battery 400, a first power source 410, a first battery 420, a second power source 430, and a second battery 440.

For example, the large-capacity battery 400 is a chargeable/dischargeable battery such as a lithium-ion battery. An electric motor for driving is driven by power supplied from the large-capacity battery 400. The large-capacity battery 400 is charged with regenerative power generated by the electric motor.

The first power source 410 reduces an output voltage of the large-capacity battery 400 and supplies power of the large-capacity battery 400 to each of the functional constitutions of the first group. For example, the first battery 420 is a 12 V lead battery. For example, when power is not supplied from the large-capacity battery 400 to a functional constitution of the first group, power of the first battery 420 is supplied to a functional constitution of the first group. In addition, the first battery 420 supplies power to the navigation device 50, the communication device 20, the driver monitoring camera 70, and some of the sensors included in the vehicle sensor 40.

The second power source 430 reduces an output voltage of the large-capacity battery 400 and supplies power of the large-capacity battery 400 to each of the functional constitutions of the second group. For example, the second battery 440 is a 12 V lead battery. For example, when power is not supplied from the large-capacity battery 400 to a functional constitution of the second group, power of the second battery 440 is supplied to a functional constitution of the second group. In addition, the second battery 440 supplies power to the steering wheel grasping sensor 84 and some of the sensors included in the vehicle sensor 40.

[Abnormality Related to Combination Switch and the Like]

Figure 6:
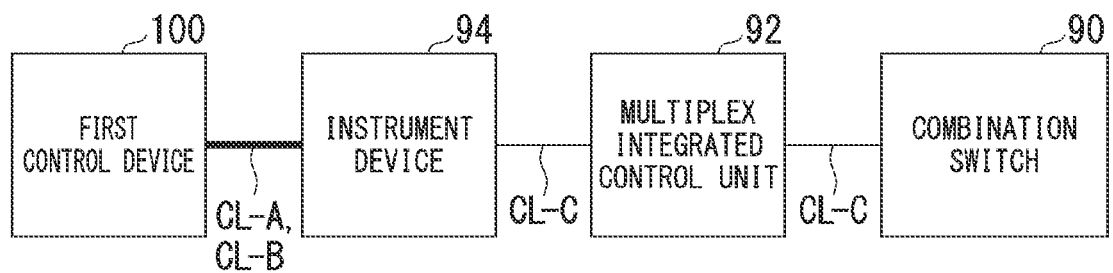
FIG. 6 is an explanatory view of connection states related to communication of a first control device 100, an instrument device 94, a multiplex integrated control unit 92, and the multiplex integrated control unit 92 with a combination switch 90.

FIG. 6 is an explanatory view of connection states related to communication of the first control device 100, the instrument device 94, the multiplex integrated control unit 92, and the multiplex integrated control unit 92 with the combination switch 90. The first control device 100 and the instrument device 94 are connected via the communication line CL-A and the communication line CL-B. The instrument device 94 and the multiplex integrated control unit 92 are connected via a communication line CL-C. The multiplex integrated control unit 92 and the combination switch 90 are connected via the communication line CL-C.

A communication speed of communication performed using the communication line CL-A and the communication line CL-B is higher than a communication speed of communication performed using the communication line CL-C. Between the devices to which the communication line CL-A or the communication line CL-B is connected, communication using so-called F-CAN is performed. Between the devices to which the communication line CL-C is connected, communication using so-called B-CAN is performed.

In description of the example in FIG. 6, the instrument device 94 is interposed between the first control device 100 and the multiplex integrated control unit 92. However, in place of this, one or more other devices may be interposed in addition to these devices. In addition, one or more other devices may also be interposed between the multiplex integrated control unit 92 and the combination switch 90. One device of the instrument device 94 and the multiplex integrated control unit 92 may be omitted, and the first control device 100 and the combination switch 90 may communicate with each other.

When an abnormality occurs in the combination switch 90, the instrument device 94, the multiplex integrated control unit 92, or the control targets of the multiplex integrated control unit 92, the abnormality judger 156 judges that an abnormality has occurred in the combination switch related equipment. For example, the control targets of the multiplex integrated control unit 92 are a driver for driving the windshield wipers, equipment or a device for controlling the lights, equipment or a device for controlling the blinkers, and the like. When a flaw occurs in communication using the communication line CL-A, the communication line CL-B, or the communication line CL-C described above, the abnormality judger 156 judges that an abnormality has occurred in communication between the combination switch 90 and the first controller 120. Hereinafter, details thereof will be described.

FIG. 7 is an explanatory view of conditions for judging an abnormality and estimated abnormalities.
(1) When the abnormality judger 156 receives information indicating a failure of the combination switch 90 from the instrument device 94 and this state has continued for a first time (for example, 1 [s]), or (2) when information indicating a failure of an automatic light switch is received from the instrument device 94 and this state has continued for the first time (for example, 1 [s]), it is estimated that a failure of the combination switch 90, a flaw of the communication line CL-C between the combination switch 90 and the multiplex integrated control unit 92 or a failure of the multiplex integrated control unit 92 has occurred. A state in which information indicating a failure is receive may include a state in which a flag indicating a failure is received, and a state in which no information can be received from a communication counterpart device (for example, a state of no signal). For example, when a state in which a flag indicating a failure is received from a communication counterpart device or a state in which a predetermined signal cannot be received from a communication counterpart device has continued for the first time, the abnormality judger 156 may judge that it corresponds to the foregoing (1) or (2).
(3) When the abnormality judger 156 receives information indicating that a turn lever is in a mechanically locked state from the instrument device 94, it is estimated that the turn lever is in a mechanically locked state and an abnormality has occurred in the turn lever. For example, a mechanically locked state indicates a state in which the first operation lever 90A is operated in the operation direction (vertical direction) for turning on the right blinker, the first operation lever 90A moves in the vertical direction from the operation position for turning on the right blinker due to this operation, and the first operation lever 90A is fixed at this position by a mechanical mechanism.
(4) When the abnormality judger 156 receives information indicating that the windshield wiper switch has failed and this state has continued for a second time (for example, 1 [s]), it is estimated that a failure of the windshield wiper switch, a flaw of the communication line CL-C between the windshield wiper switch and the multiplex integrated control unit 92, or a failure of the multiplex integrated control unit 92 has occurred.
(5) When the abnormality judger 156 receives information indicating that the multiplex integrated control unit 92 has failed the instrument device 94 and this state has continued for a third time (for example, 1 [s]), it is estimated that a failure of the multiplex integrated control unit 92, a flaw of the communication line CL-C between the multiplex integrated control unit 92 and the instrument device 94, or a failure of the instrument device 94 has occurred. The abnormality judger 156 may perform only some of the judgment processing of the foregoing (1) to (5).

FIG. 8 is an explanatory view of conditions for starting judgment of (1) to (5) in FIG. 7. Judgment of (1), (2), (4), and (5) in FIG. 7 starts when all the following conditions (a) to (c) are satisfied.
(a) A fourth time (for example, 5 [s]) has elapsed in a state in which a voltage input to the first control device 100 is a first voltage or higher (for example, 10 V or higher).
(b) A communication state between the first control device 100 and the instrument device 94 is normal.
(c) No abnormality has occurred in communication using the communication line CL-C connected to the instrument device 94.

The judgment of (3) in FIG. 6 is performed at all times. For example, it is performed from when the power source of the vehicle M is in an on-state until it is in an off-state.

[Flowchart (1)]

Figure 9:
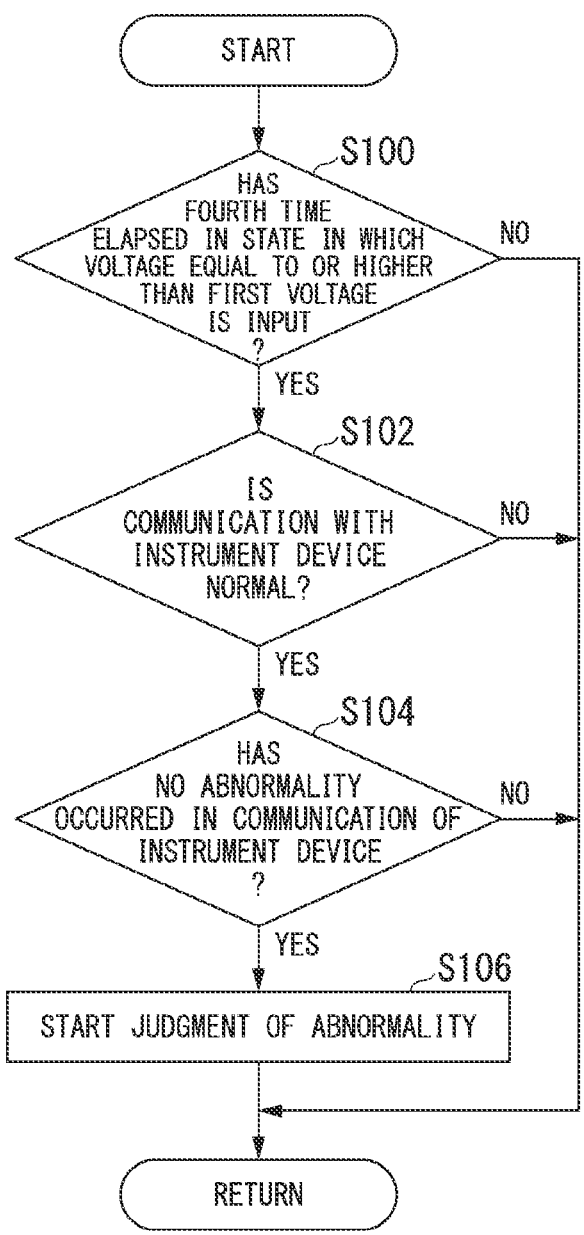
FIG. 9 is a flowchart showing an example of a flow of processing executed by an abnormality judger 156 of the first control device 100.

FIG. 9 is a flowchart showing an example of a flow of processing executed by the abnormality judger 156 of the first control device 100. This processing is processing for determining whether or not the judgment of (1), (2), (4), and (5) in FIG. 7 is started. For example, this processing is started when the power source of the vehicle M is in an on-state.

First, the abnormality judger 156 judges whether or not the fourth time has elapsed in a state in which a voltage equal to or higher than the first voltage is input to the first control device 100 (Step S100). When the fourth time has elapsed in a state in which a voltage equal to or higher than the first voltage is input, the abnormality judger 156 judges whether or not communication with the instrument device 94 is normal (Step S102).

When communication with the instrument device 94 is normal, the abnormality judger 156 judges whether or not no abnormality has occurred in communication using the communication line CL-C connected to the instrument device 94 (Step S104).

When it is judged that no abnormality has occurred in communication using the communication line CL-C connected to the instrument device 94, the abnormality judger 156 starts abnormality judgment of (1), (2), (4), and (5) in FIG. 7 (Step S106). When the judgment in Steps S100, S102, and S104 is negative, one routine of this flowchart ends. The order of the processing of the foregoing Steps S100 to S104 may be changed.

Through the foregoing processing, it is possible to curb a situation in which the vehicle system 1 performs unnecessary judgment processing.

[Flowchart (2)]

Figure 10:
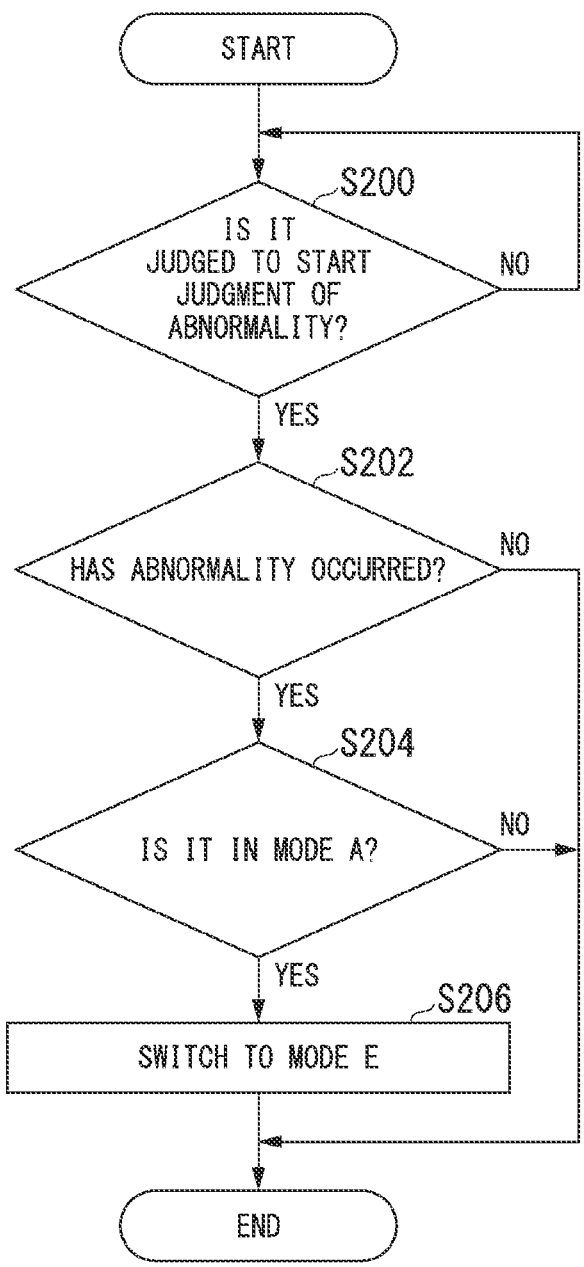
FIG. 10 is a flowchart showing an example of a flow of processing executed by a mode determinator 150.

FIG. 10 is a flowchart showing an example of a flow of processing executed by the mode determinator 150. First, the abnormality judger 156 judges whether or not it is determined that abnormality judgment is started (Step S200). When it is determined that abnormality judgment is started, the mode determinator 150 judges whether or not the abnormality judger 156 has judged that an abnormality has occurred in the combination switch 90, equipment related to the combination switch 90, or communication between the combination switch 90 and the first control device 100 (Step S202). When a judgment result of any of (1) to (5) in FIG. 7 is positive, the abnormality judger 156 judges that an abnormality has occurred in the foregoing equipment or the like.

When an abnormality has occurred, the mode change processor 154 judges whether or not the driving mode is the mode A (Step S204). When the driving mode is the mode A, the mode change processor 154 switches the driving mode to the mode E (Step S206). In this case, for example, the mode change processor 154 prompts the occupant of the vehicle M to perform a driving operation, and when the occupant performs a driving operation within a predetermined time, the mode change processor 154 switches the driving mode to the mode E. When the occupant does not perform a driving operation within a predetermined time, the first control device 100 more strongly prompts the occupant of the vehicle M to perform a driving operation, decelerates the vehicle M, or stops the vehicle M at a predetermined position.

When the judgment in Step S202 or S204 is negative, one routine of this flowchart ends.

Through the processing described above, the vehicle system 1 can more appropriately control the vehicle M when an abnormality has occurred.

In description of the foregoing example, if the driving mode is the mode A, it is switched to the mode E when an abnormality has occurred. However, in place of this, when the driving mode is a predetermined driving mode (an arbitrary mode such as the mode B), the mode change processor 154 may switch it to the mode E. In addition, instead of switching it to the mode E, the mode change processor 154 may switch it to a different arbitrary driving mode. A different driving mode is a driving mode more significant than the driving mode which has been subjected to judgment processing in Step S204.

According to the embodiment described above, the first control device 100 can control the vehicle M in a second driving mode and when an abnormality occurs in the combination switch, equipment related to the combination switch 90 which is connected between the first control device 100 and the combination switch 90 via the communication line, or communication which is performed by the combination switch 90 and the first control device 100, the vehicle can be more appropriately controlled by changing the driving mode to a first driving mode.

For example, the combination switch or the equipment working in response to the combination switch 90 (the windshield wipers, the blinkers, the lights, and the like) is a target to be controlled by the first control device 100 during automated driving. In addition, the foregoing equipment is equipment which can be controlled by the driver during automated driving. When the vehicle system 1 cannot appropriately control such equipment, the function of the first control device 100 appropriately controlling the vehicle may be disrupted, or an operational intention of the driver may not be appropriately reflected in automated driving. In the present embodiment, when an abnormality occurs in the equipment or the like as described above, the first control device 100 appropriately changes the driving mode, and thus the vehicle can be more appropriately controlled.

The embodiment described above can be expressed as follows.

A vehicle control device is constituted to include a storage device storing a program and a hardware processor. When the hardware processor executes the program, one of or both steering and acceleration/deceleration of a vehicle is controlled, and any of a plurality of driving modes including a first driving mode and a second driving mode is determined as a driving mode of the vehicle, in which tasks imposed on a driver in the second driving mode are less significant than in the first driving mode and one of or both steering and acceleration/deceleration of the vehicle are controlled without depending on an operation of the driver of the vehicle, the vehicle is controlled in the second driving mode, and the driving mode is changed to the first driving mode when an abnormality occurs in a combination switch, combination switch related equipment which is connected between the computer and the combination switch via a communication line, or communication which is performed by the combination switch and the computer.

Hereinabove, a form for performing the present invention has been described using the embodiment. However, the present invention is not limited to such an embodiment at all, and various modifications and replacements can be added within a range not departing from the gist of the present invention.

REFERENCE SIGNS LIST

1 Vehicle system
10 Camera
16 First recognition device
20 Communication device
40 Vehicle sensor
50 Navigation device
70 Driver monitoring camera
80 Driving operation piece
82 Steering wheel
84 Steering wheel grasping sensor
90 Combination switch
92 Multiplex integrated control unit
94 Instrument device
100 First control device
120 First controller
130 Recognizer
140 Action plan generator
150 Mode determinator 152 Driver state judger
154 Mode change processor
160 Second controller
162 Acquirer
164 Speed controller
166 Steering controller
170 First monitor
200 Traveling drive force output device
210 Brake device
220 Steering device
250 Steering ECU
252 Drive ECU
260 Brake ECU
262 Stop retention ECU
264 First notification ECU
266 External notification ECU
270 HUD
300 Second control device
310 Camera
312 Radar device
320 Second control device
330 Second recognizer
340 Vehicle controller
342 Second monitor
350 Steering ECU
350 Steering ECU
362 Brake ECU
364 Stop retention ECU
366 Second notification ECU
400 Large-capacity battery
410 First power source
420 First battery
430 Second power source
440 Second battery

What is claimed is:

1. A vehicle control device comprising:
a first control device configured to include
a recognizer configured to recognized surrounding circumstances of a vehicle,
a first driving controller configured to controlled one of or both steering and acceleration/deceleration of the vehicle, and
a mode determinator configured to controlled determined any of a plurality of driving modes including a first driving mode and a second driving mode as a driving mode of the vehicle; and
a second control device configured to include a second driving controller configured to controlled executing traveling control of the vehicle by controlling steering and braking of the vehicle,
wherein tasks imposed on a driver in the second driving mode are less significant than the tasks imposed on the driver in the first driving mode and one of or both steering and acceleration/deceleration of the vehicle are controlled by the first driving controller,
wherein the mode determinator changes the driving mode to the first driving mode when the first driving controller controls the vehicle in the second driving mode and when an abnormality occurs in a combination switch, combination switch related equipment which is connected between the first driving controller and the combination switch via a communication line, or communication which is performed by the combination switch and the first driving controller,
wherein the first control device monitors the presence or absence of an abnormality in a second control target that is a target controlled by the second driving controller of the second control device for controlling steering or braking of the vehicle,
wherein the second control device monitors the presence or absence of an abnormality in a first control target that is different from the second control target and is a target controlled by the first driving controller of the first control device for controlling steering or acceleration/deceleration of the vehicle, and
wherein when the second control device judges that an abnormality has occurred in the first control target in a state in which the first driving controller of the first control device controls one of or both the steering and the acceleration/deceleration, in place of the first driving controller of the first control device, the second driving controller of the second control device controls the vehicle and performs automated driving by controlling the second control target different from the first control target.

2. The vehicle control device according to claim 1,
wherein the first control target includes a first steering controller which controls steering in association with the first driving controller and a first braking controller which controls braking in association with the first driving controller, and
wherein the second control target includes a second steering controller which is different from the first steering controller and controls steering in association with the second driving controller and a second braking controller which is different from the first braking controller and controls braking in association with the second driving controller.

3. The vehicle control device according to claim 1,
wherein the second driving mode is a mode in which a task of monitoring an area around the vehicle and a task of grasping a steering wheel are not imposed on the driver, and
wherein the first driving mode is a mode in which the vehicle is controlled by a driving operation of the driver.

4. The vehicle control device according to claim 1,
wherein the combination switch is provided in a steering wheel of the vehicle or in the vicinity of the steering wheel and includes a switch for operating at least headlights, direction indicators, and windshield wipers of the vehicle.

5. The vehicle control device according to claim 1,
wherein the combination switch related equipment includes at least one of an instrument device which controls an instrument connected between the first driving controller and the combination switch via a communication line, a control device which is connected between the first driving controller and the combination switch via a communication line and controls target equipment for an operation performed with respect to the combination switch on the basis of the operation, and a driver which drives target equipment for the operation on the basis of an operation of the combination switch.

6. The vehicle control device according to claim 1,
wherein the mode determinator judges that the abnormality has occurred when information indicating that a switch included in the combination switch has failed or information indicating that the combination switch related equipment has failed is continuously acquired for a first time or longer.

7. The vehicle control device according to claim 6,
wherein the mode determinator starts to judge whether or not the abnormality has occurred when a state in which a voltage input to the first driving controller is a first voltage or higher has continued for the first time, a communication state between the combination switch related equipment and the first driving controller is normal, and no abnormality has occurred in a communication state between the combination switch related equipment and the combination switch.

8. A vehicle system comprising:

the vehicle control device according to claim 1;

an instrument device configured to be connected to the vehicle control device via a first communication line, communicate with the vehicle control device on the basis of a first communication protocol, and control an instrument;

an integrated control device configured to be connected to the instrument device via a second communication line, communicate with the instrument device on the basis of a second communication protocol, and control target equipment for an operation performed with respect to the combination switch on the basis of the operation; and the combination switch configured to be connected to the integrated control device via a third communication line, communicate with the vehicle control device on the basis of the second communication protocol, and output a signal corresponding to an operation of an occupant of the vehicle to the integrated control device, wherein a communication speed of communication using the first communication protocol is higher than a communication speed of communication using the second communication protocol, wherein the mode determinator changes the driving mode to the first driving mode when the first driving controller controls the vehicle in the second driving mode and a condition of (A), (B), (C) or (D) is satisfied, wherein in (A), the mode determinator continuously receives information indicating a failure of the combination switch from the instrument device for a first time, wherein in (B), the mode determinator continuously receives information indicating a failure of an automatic light switch included in the target equipment from the instrument device for the first time, wherein in (C), the mode determinator continuously receives information indicating a failure of a windshield wiper switch included in the target equipment from the instrument device for a second time, and wherein in (D), the mode determinator continuously receives information indicating a failure of the integrated control device from the instrument device for a third time.

* * * * *